(12) United States Patent
Ginns et al.

(10) Patent No.: US 12,070,920 B2
(45) Date of Patent: Aug. 27, 2024

(54) ARTICLE OF FOOTWEAR WITH COFFEE GRINDS

(71) Applicant: KEEN, Inc., Menlo Park, CA (US)

(72) Inventors: Nicholas Charles Ginns, Chonburi (TH); Arkom Kaewprasit, Bangmuang Muang Samutprakarn (TH)

(73) Assignee: KEEN, INC., Portland, OR (US)

( * ) Notice: Subject to any disclaimer, the term of this patent is extended or adjusted under 35 U.S.C. 154(b) by 0 days.

(21) Appl. No.: 17/807,354

(22) Filed: Jun. 16, 2022

(65) Prior Publication Data
US 2022/0410517 A1    Dec. 29, 2022

Related U.S. Application Data

(60) Provisional application No. 63/214,673, filed on Jun. 24, 2021.

(51) Int. Cl.
| | |
|---|---|
| *B29D 35/00* | (2010.01) |
| *A43B 1/00* | (2006.01) |
| *A43B 1/14* | (2006.01) |
| *B29K 75/00* | (2006.01) |
| *B29K 311/00* | (2006.01) |

(52) U.S. Cl.
CPC ........ *B29D 35/0009* (2013.01); *A43B 1/0045* (2013.01); *A43B 1/14* (2013.01); *B29K 2075/00* (2013.01); *B29K 2311/00* (2013.01)

(58) Field of Classification Search
CPC ............ B29C 45/0053; B29D 35/0045; B29D 35/0009; A43B 1/14; A43B 1/0045
See application file for complete search history.

(56) References Cited

U.S. PATENT DOCUMENTS

| | | |
|---|---|---|
| RE37,095 E | 3/2001 | Glorioso et al. |
| 8,440,138 B1 | 5/2013 | Standifer et al. |
| 2012/0114796 A1 | 5/2012 | Lai et al. |
| 2019/0380433 A1 | 12/2019 | Chang et al. |
| 2020/0000176 A1 | 1/2020 | Chang et al. |
| 2020/0305540 A1* | 10/2020 | Castro Ramos ......... A43B 1/02 |

FOREIGN PATENT DOCUMENTS

| | | | |
|---|---|---|---|
| CN | 102333597 | * | 2/2010 |
| KR | 102117196 | * | 9/2019 |

* cited by examiner

*Primary Examiner* — Stella K Yi
(74) *Attorney, Agent, or Firm* — McCoy Russell LLP

(57) ABSTRACT

A method for fabrication of one or more components of an article of footwear is provided. In one example, the method includes fabricating a mixture of polyurethane (PU) precursors and coffee grounds of a first size using a two-step mixing, and then injection molding one or more components of the article of footwear using the mixture, the one or more components of the article of footwear formed of a coffee grounds-PU composite material.

15 Claims, 7 Drawing Sheets

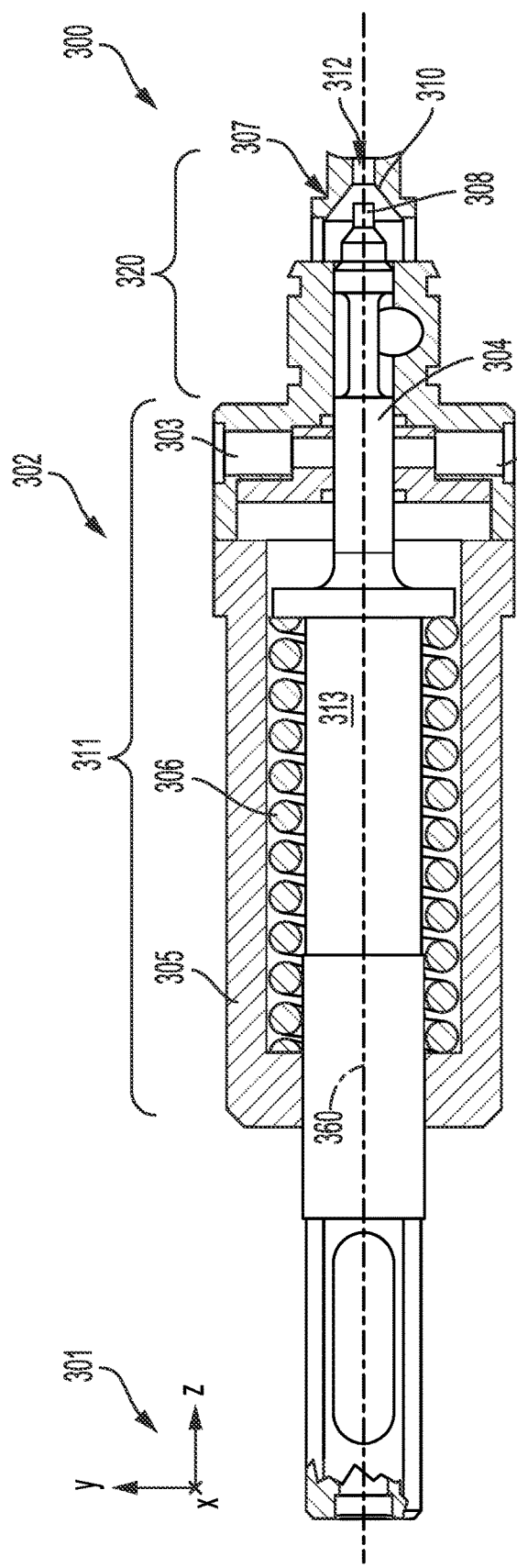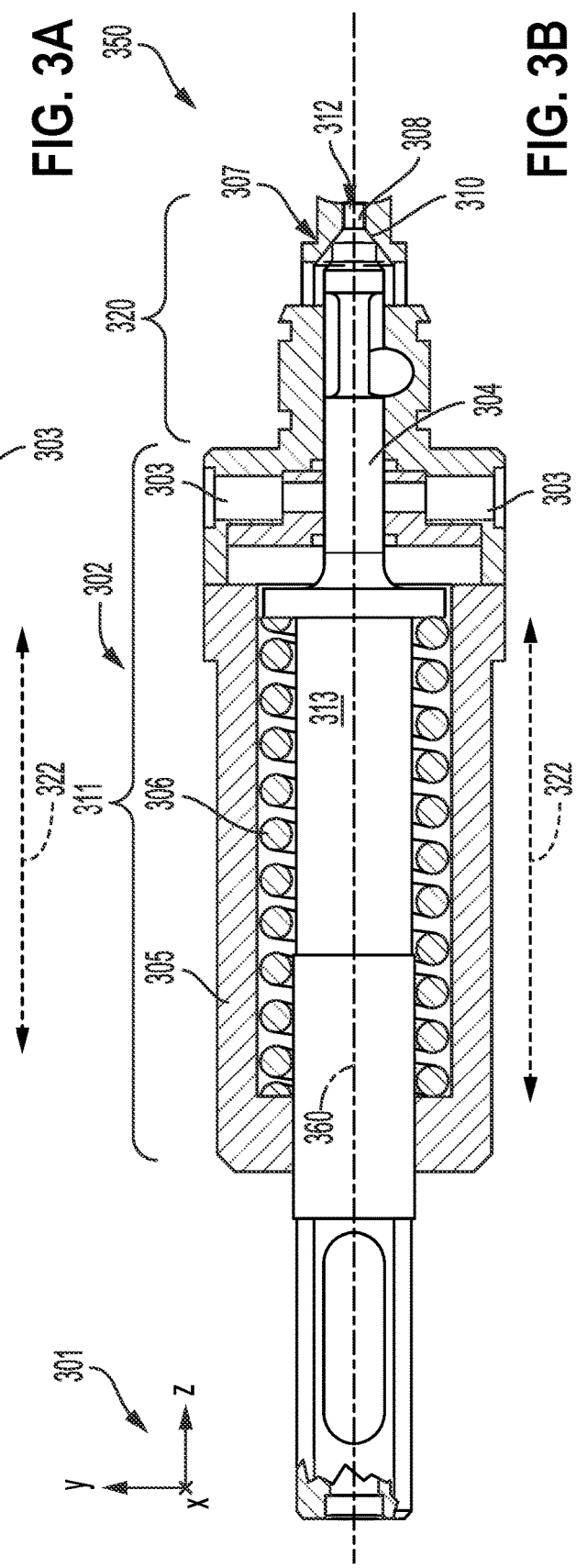

ARTICLE OF FOOTWEAR WITH COFFEE GRINDS

CROSS REFERENCE TO RELATED APPLICATIONS

The present application claims priority to U.S. Provisional Application No. 63/214,673 entitled ARTICLE OF FOOTWEAR WITH COFFEE GRINDS, and filed on Jun. 24, 2021. The entire contents of the above-listed application are hereby incorporated by reference for all purposes.

BACKGROUND/SUMMARY

Foot wear articles may include components, such as soles, formed at least in part using organic polymer materials such as polyurethane (PU). A footwear sole manufactured from PU may have a lower density than soles formed from other materials, such as leather or rubber, and may further demonstrate greater elasticity. A comparatively softer texture of PU may provide increased cushioning and comfort to a wearer. Further, PU soles may exhibit desirable resistance to wear and tear and to bending while providing a degree of hardness and of shock absorption that is attractive to the wearer. Additionally, PU soles may be water resistant while maintaining traction on wet surfaces.

Although PU is readily recyclable, either in an original polymer form or after being broken down chemically, PU products may nevertheless enter a waste stream and, for example, be disposed of at landfills. Natural decomposition of PU may demand a prolonged period of time. As PU is nontoxic and highly durable, rising popularity of PU for a variety of industries may bolster manufacturing of PU products, and, as a result, lead to increased generation of PU waste. Furthermore, increasing demand may drive up a cost of PU globally. Strategies for reducing an amount of PU used in PU products without compromising advantageous properties of PU may therefore be desirable.

In order to reduce an amount of PU used in, for example, footwear articles, a portion of the PU may be substituted with an abundant, low cost, and readily compostable material. In one example, coffee grinds or grounds may be incorporated into one or more components of a footwear article. Due to a popularity of coffee consumption, a supply of coffee grounds may be plentiful. In some regions, such as urban areas, a rate of supply of coffee grounds of may outpace a rate of decomposition (e.g., composting) of coffee grounds, thereby providing a reliable source of waste materials produced via coffee consumption. Further, coffee grounds have advantageous attributes, such as high porosity, moisture absorption, and a pleasant aroma, and may increase a consumer appeal of footwear articles incorporating coffee grounds therein.

However, incorporating coffee grounds into the PU materials used for forming footwear components which are direct injection molded, such as soles, may be challenging without extensive and costly modifications to currently available processes for footwear manufacturing. In addition, a variability in grind (e.g., grain size) of coffee grounds may hinder uniform dispersion of the grinds within a polymer matrix. Coffee grounds may form agglomerates, a presence of which may complicate processing and exacerbate wear on processing equipment. Further, a high water content of coffee grounds may dilute a mechanical strength of a resulting coffee grounds-PU composite material and negate desirable properties of pristine PU. Lastly, it may be challenging to bond a footwear component formed with the coffee grounds-PU composite material to other footwear components, which may lead to an increased likelihood of delamination and detachment.

In one embodiment, a method for fabrication of an article of footwear is provided to at least partially resolve the issues described above. In one example, the method includes fabricating a mixture of polyurethane (PU) precursors and coffee grounds of at least one selected grind group using a two-step mixing, and injection molding one or more components of the article of footwear onto another component of the footwear using a resulting coffee grounds-PU composite material.

In one example, the coffee grounds may be dried to remove water followed by sorting according to grind. A predetermined amount of a selected grind of the coffee grounds may be pre-mixed with PU chemical precursors and the mixture may be combined in an agitation tank. The agitation tank may be fitted with at least two sets of impellers to enable uniform mixing of the coffee grounds with chemical precursors of PU. The mixture of coffee grounds and the PU chemical precursors is injected via a direct soling instrument, the instrument including a modified valve with an aperture (opening) adapted for the grind of the coffee grounds, thereby enabling injection of the mixture of coffee grounds and PU chemical precursors with consistent and controllable flow through the valve. Thus, larger diameter valves may be used, relative to conventional injection systems. The mixture of coffee grounds and PU chemical precursors may be directly molded onto another footwear component such as a footwear upper, during which the PU may foam and form a coffee grind-PU composite footwear component.

In this way, by premixing the coffee grounds with a polymer material, e.g., the PU chemical precursors, in an agitation tank with at least two impellers, a distribution of the coffee grounds in a PU matrix may be uniform. The technical effect of using a valve of a direct soling instrument with a larger opening is that the mixture of coffee grounds and PU chemical precursors may be injection molded efficiently to form a footwear component that does not demand additional steps to couple the footwear component to other components. By drying the coffee grounds and incorporating coffee grounds of a selected grind group coffee grounds into a footwear article, a strength and visual aesthetic of the footwear article may be maintained, relative to pristine PU. Additionally, a bonding between an upper and a midsole of the footwear article may be strengthened. Overall, by reusing an abundant, natural product such as waste coffee grounds, an amount of PU used in the foot article may be reduced, thereby decreasing costs.

BRIEF DESCRIPTION OF THE FIGURES

The present disclosure will be better understood from reading the following description of non-limiting embodiments, with reference to the attached drawings, wherein below:

FIG. 3A is a cross-section of the valve of FIG. 6 of the direct soling instrument, showing the valve in a first, open position;

FIG. 3B is a cross-section of the valve of FIG. 6, showing the valve in a second, closed position;

DETAILED DESCRIPTION

Figure 1:
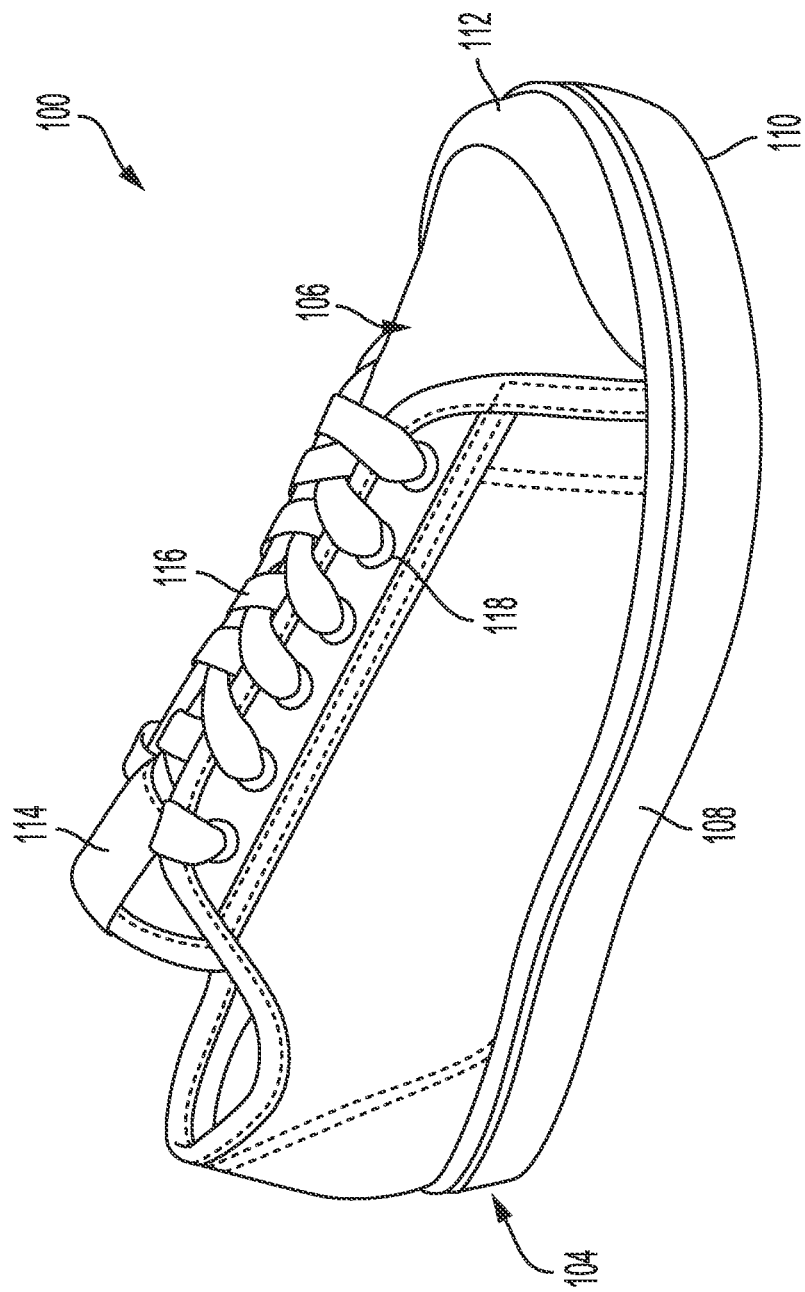
FIG. 1 is a lateral side elevation view of a footwear article having a coffee grounds-PU (CG-PU) composite midsole.
Figure 2:
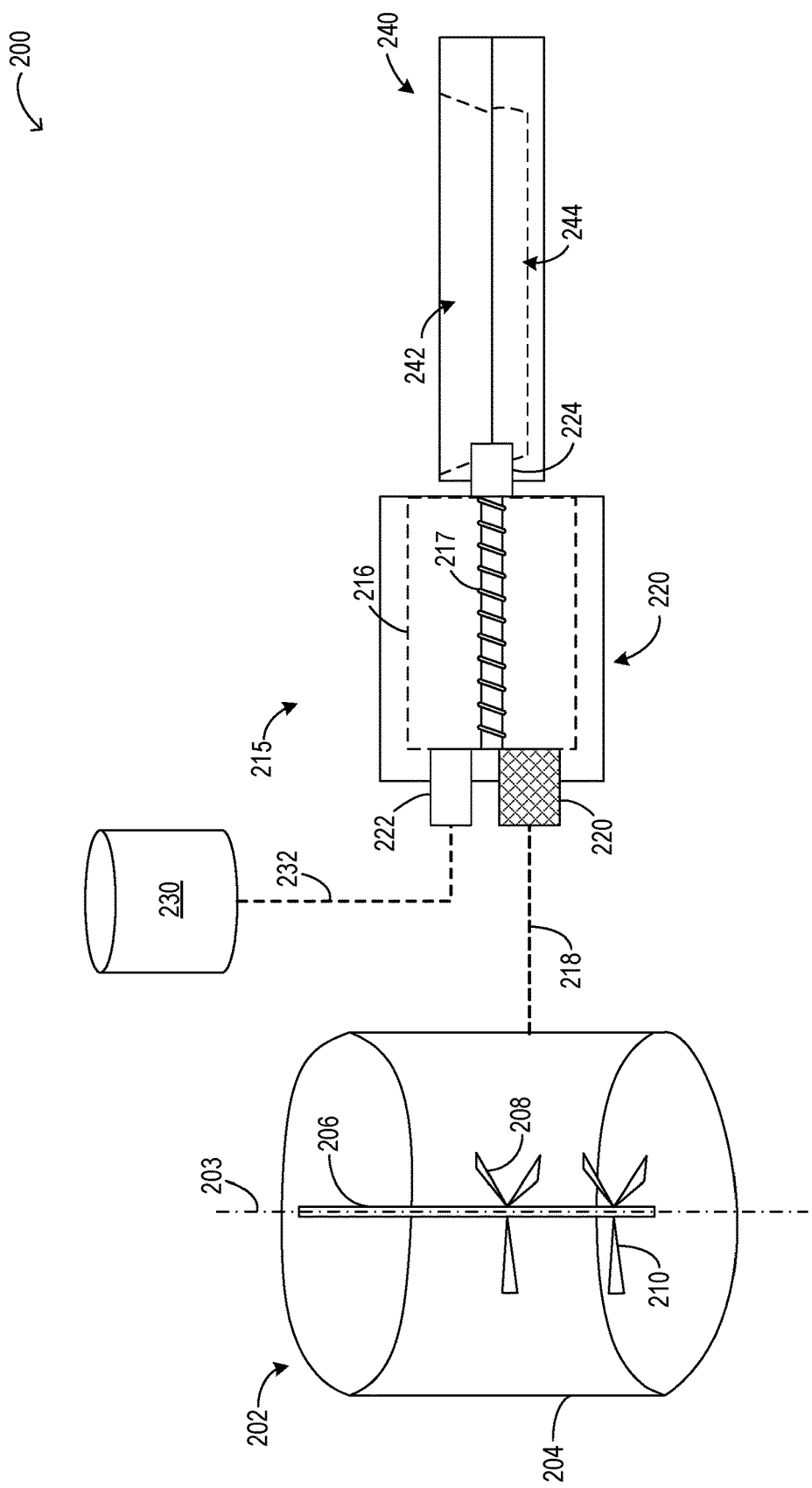
FIG. 2 is a diagram of a system used for processing and forming the CG-PU composite midsole, the system including an agitator and a direct soling instrument.
Figure 4:
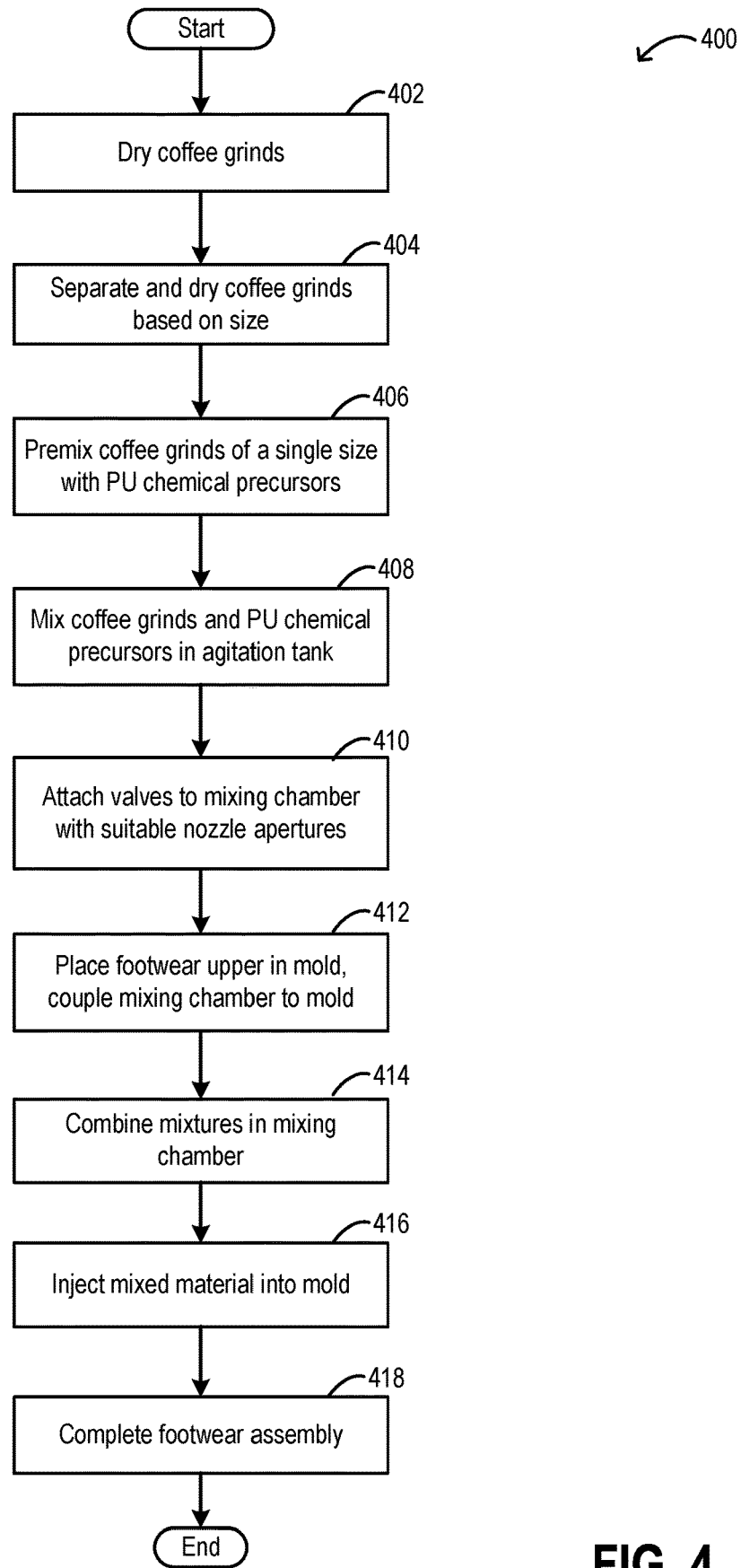
FIG. 4 is a flow-chart of an example method for processing the CG-PU composite midsole.
Figure 5A:
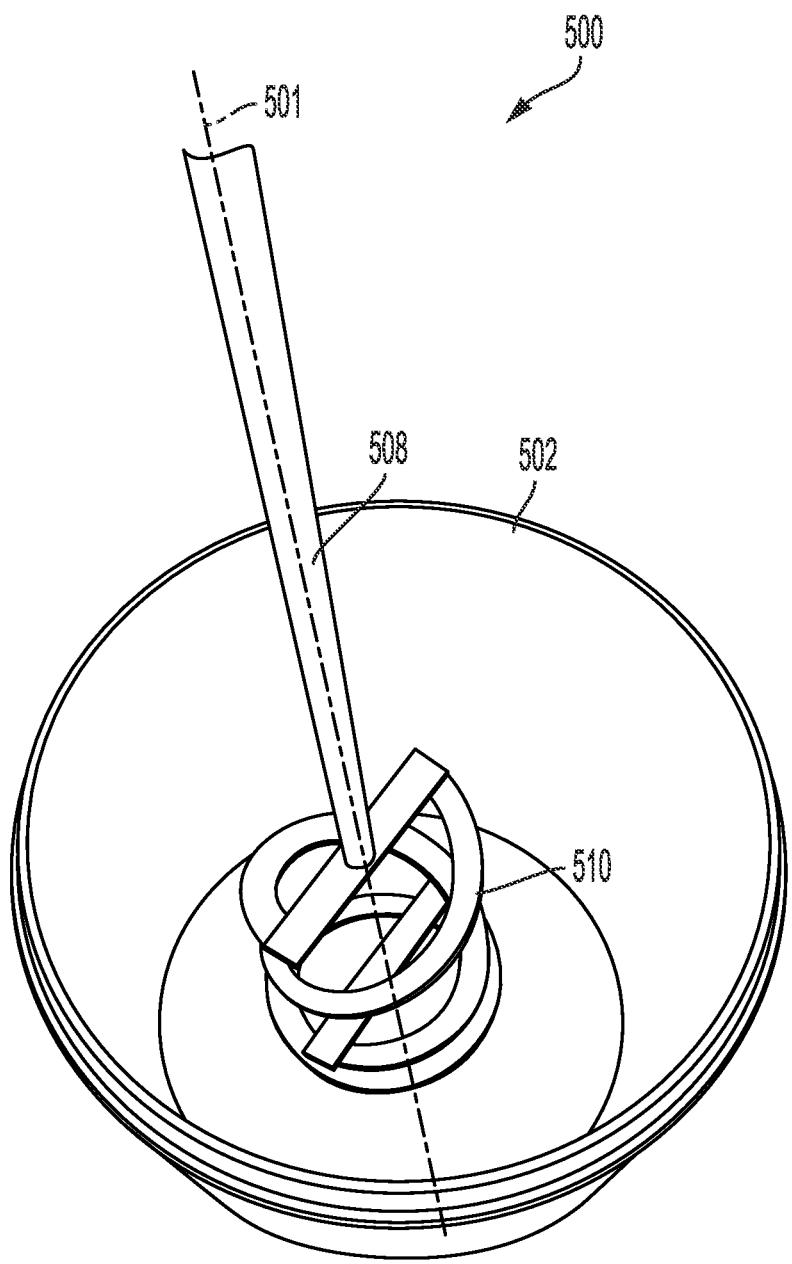
FIG. 5A is an example of a mixing head of a mechanical mixer for pre-mixing constituents of the CG-PU composite.
Figure 5B:
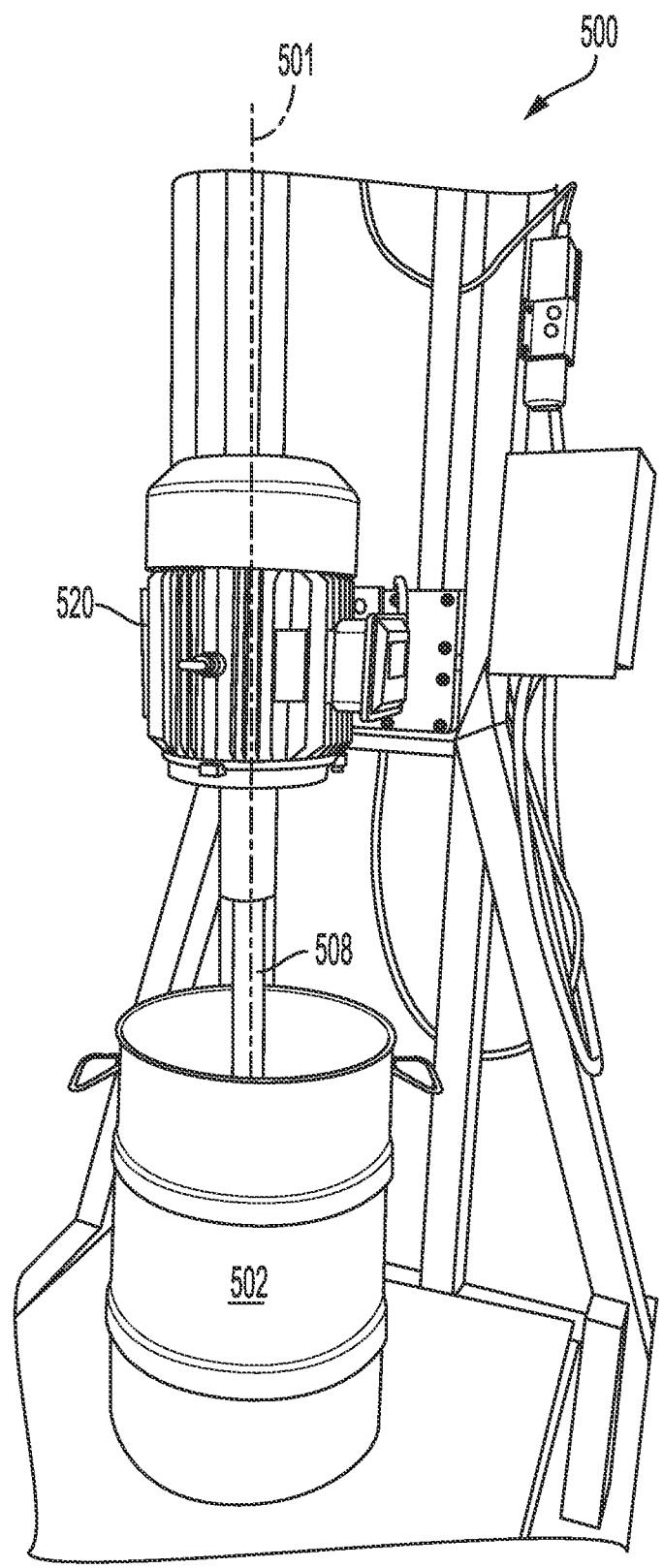
FIG. 5B is an example of a motorized portion of the mechanical mixer of FIG. 5A.
Figure 6:
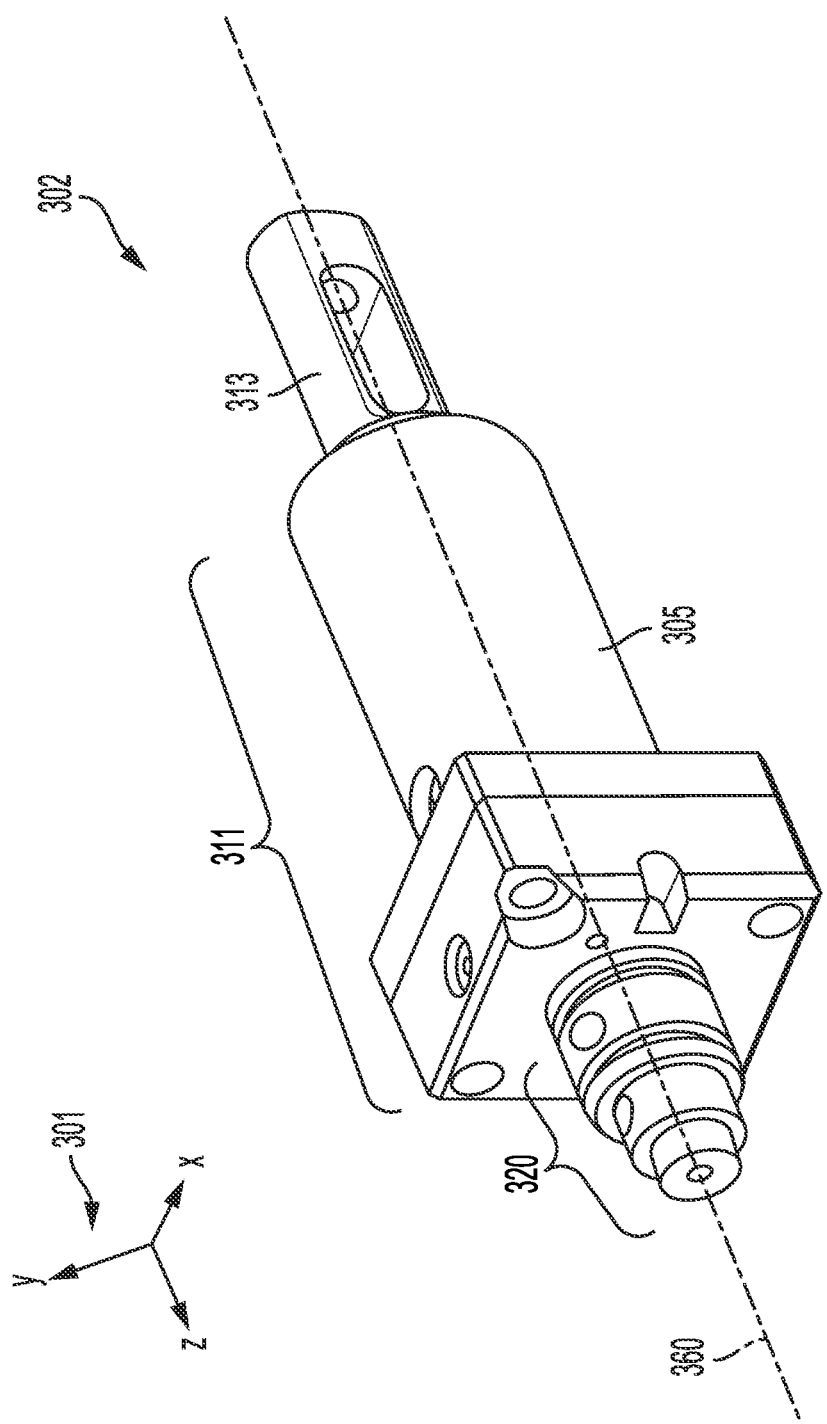
FIG. 6 is an example of a valve used to inject PU chemical precursors into a mixing chamber of the direct soling instrument.

The following description relates to a method for manufacturing a footwear component such as a midsole of a footwear article using a coffee grounds-polyurethane (hereafter, CG-PU) composite. An example of a footwear article having a CG-PU midsole, as manufactured by a method depicted in FIG. 4, is shown in FIG. 1. The method may include pre-mixing the coffee grounds with chemical precursors of the PU using a mechanical mixer, as depicted in FIGS. 5A-5B. A system that may be used to form at least one component of the footwear article, using the pre-mixed coffee grounds with the chemical precursors, is shown in FIG. 2, which may include a modified valve as illustrated in FIGS. 3A, 3B, and 6.

Turning now to FIG. 1, a footwear article 100 is shown from a lateral side elevation view, according to an embodiment. The footwear article 100 may include an upper 106 and a sole 104. The upper 106 may include a tongue 114, lacing 116, eyelets 118, and other components, such as hook and loop materials, and the like for securing the footwear article 100 to a user's foot.

The sole 104 may include an outsole 110, a midsole 108, and an insole (not shown). The outsole 110 may include an exposed surface of the sole 104 that is contact with the ground, e.g., an exterior, ground-interfacing side of the footwear article 100. In some examples, the exposed surface of the outsole 110 (and of the footwear article 100) may include a texturized pattern to improve grip, durability, and water resistance. The outsole 110 may form a bottom, outermost layer of the sole 104 and insole may form an innermost layer of the sole 104, e.g., positioned closest to the user's foot. In one example, the insole may be formed within the shoe (e.g., inside of) such that the insole is enclosed within the upper 106 of the footwear article 100. The footwear article 100 may include a toe cap 112 arranged in a front portion of the upper 106, extending over ends of the user's toes. The toe cap 112 may add strength to a corresponding region of the footwear article 100, which may be an area prone to stress and wear during use.

The midsole 108 may be a layer located between the insole and the outsole 110 and may be configured to absorb shock and provide cushioning. In some examples, particularly for athletic footwear articles, the midsole 108 may control pronation of the user's foot, thereby directly affecting the user's comfort while the footwear article 100 is worn. A composition of the midsole 108 may determine a durability, absorptive and cushioning properties, and a useful life of the footwear article 100. For example, the midsole 108 may be formed of ethylene vinyl acetate (EVA), thermal plastic unit (TPU), PU and/or combinations thereof. When formed of PU, the midsole 108 may be heavier and more firm than when the midsole 108 is formed of EVA, for example. Midsoles composed of PU may therefore be favorable for heavy duty applications, such as for hiking boots, hiking shoes, hiking sandals, water sandals, etc.

While PU offers various advantages, such as durability, nontoxicity when cured, and versatility for use across different applications and industries, disposal of PU may lead to accumulation of PU waste. The accumulation of PU waste may be exacerbated by a relatively long decomposition time of PU under natural environmental conditions. Reducing an amount of PU used in products, such as footwear articles, may be desirable. In addition, reducing the amount of PU by incorporating a natural material that is easily separated from a PU matrix and composted when waste PU is disposed of or prepared for recycling, may provide benefits with respect to cost and environmental effects.

In one example, coffee grounds may be added to PU and used to form one or more components of the footwear article 100. By incorporating the coffee grounds into a material of the one or more components, an amount of PU used to form the one or more components may be reduced. In one example, at least the midsole 108 of the footwear article 100 may be formed from a CG-PU composite. A manufacturing process for the CG-PU composite may include a two-step mixing process of the coffee grounds with PU chemical precursors. A resulting mixture may be directly injected into a mold for forming the midsole 108 using a modified valve, the valve including a nozzle adapted to allow the coffee grounds to pass therethrough without adversely affecting flow through the nozzle.

During manufacture of the footwear article 100, the upper 106 may be formed from a first material (such as canvas) and at least the midsole 108 of the sole 104, may be injection molded directly onto the upper 106. Injection molding directly onto an upper may be accomplished by a direct soling instrument, as shown schematically in FIG. 2 and described further below. The toe cap 112 may also be added to the upper 106 during the injection molding of the midsole 108. In this example, the midsole 108 and the toe cap 112 may be formed with the CG-PU composite concurrently.

In a first step, chemical precursors of PU may be combined with dried coffee grounds of a first size in a container and the chemical precursors of PU with the coffee grounds may be mixed using a mechanical mixer including a mixing head. In a second step, the chemical precursors of PU may be further mixed with the coffee grounds in an agitation tank fitted with at least two impellers. The two impellers may include each of a first impeller and a second impeller coupled to a mixing rod, the first impeller closer to a base of the agitation tank relative to the second impeller. During the second step, the first impeller may rotate to push a mixture of the chemical precursors of PU with the coffee grounds upwards while the second impeller may rotate (in the same direction as the first impeller or an opposite direction to the first impeller) to push the mixture downward. The mixture of the chemical precursors of PU with the coffee grounds may then be transferred from the agitation tank to a direct soling instrument for the injection molding of one or more components of the article of footwear.

The mixture of the chemical precursors of PU with the coffee grounds may be further mixed using a rotating screw prior to the injection molding. The injection molding may include injecting the mixture of coffee grounds and PU chemical precursors into a mold via a valve including a nozzle with an aperture adjusted based on a size of the coffee grounds (such as an aperture of at least 3 mm). Another component of the article of footwear (such as the upper) may be placed above (or below) the cavity of the mold and the mixture of coffee grounds and PU chemical precursors may be injected into the mold to form the one or more components of the article of footwear (such as the midsole and the toe cap) directly below and in contact with the another component of the article of footwear. In this way, a CG-PU composite may be formed and the midsole may be chemically bound to the upper during the direct soling. The composite midsole and the toe cap may be aromatic due to a presence of the coffee grounds. A method for forming the mixture of coffee grounds and PU chemical precursors and manufacturing a footwear article with a component incorporating the mixture of coffee grounds and PU chemical precursors is elaborated in FIG. 4.

Non-limiting embodiments of a footwear article are described and illustrated herein. It should be appreciated that one or more components, features, or parts of the articles of the footwear article may have a different shape, size, orientation, material, or other characteristic than those specifically explained or illustrated in accordance with the present disclosure. For example, a sole of the footwear article may be incorporated as part of a sandal, thong flip-flops, clamp flip-flops, sporting footwear, boots, occupational footwear (e.g. work boots), or any other variation of a footwear article that includes a midsole assembly. Further, in other examples, one or more components of the footwear article incorporating a CG-PU composite may be formed in an open mold by a PU pouring process instead of an injection process.

Techniques for forming the CG-PU composite may include a two-step mixing process. In one example, a first step of the two-step mixing process may include pre-mixing the coffee grounds and PU chemical precursors using a mechanical mixer 500, as shown in FIGS. 5A-5B. A mixing head 510 of the mechanical mixer 500 is shown in FIG. 5A and an upper, motorized portion of the mechanical mixer 500 is depicted in FIG. 5B. The coffee grounds may be pre-mixed with, for example, polyisocyanate components (e.g., monomers) to evenly disperse the coffee grounds into the liquid phase PU chemical precursors. The coffee grounds/PU chemical precursors mixture may be added to an open container 502, e.g., a bucket 502, and, as shown in FIG. 5A, a mixing head 510 of the mechanical mixer 500 may be inserted into the bucket 502, in contact with the mixture, to stir the mixture.

As shown in FIG. 5B, the mechanical mixer 500 may be an electric device with a motor 520 located at a top of the mechanical mixer 500. A rotating shaft 508 may extend between the handle/motor and the mixing head 510, where the mixing head 510 may be fixedly coupled to a first end of the rotating shaft 508 that is inserted into the bucket 502. In one example, as shown in FIG. 5A, the mixing head 510 may be a helical or spiral blade, e.g., a rotating helix. The rotating shaft 508 may be mechanically coupled to the motor 520 at a second, opposite end such that when the motor 520 is activated, the rotating shaft 508 is compelled to rotate about a central axis 501 of the mechanical mixer 500. Rotation of the rotating shaft 508 may drive rotation of the mixing head 510, thereby agitating the mixture in the bucket 502. A pre-mixed material, formed of the coffee grounds/PU chemical precursors mixture, may be further processed using a system 200 illustrated in FIG. 2.

Turning now to FIG. 2, the system 200 may be used for processing and fabrication of a CG-PU composite component of a sole of a footwear article. In one example, the component may be a midsole, such as the midsole 108 of FIG. 1. As described above, coffee grounds may be pre-mixed with chemical precursors used to form the pre-mixed material using the mechanical mixer 500 of FIG. 5. The chemical precursors for forming a PU matrix of the CG-PU composite may include at least one polyisocyanate component, polyol, polypropylene oxide, a chain extender, polyetherpolyols, polymer polyether polyols, chain extender, catalysts, blowing agent, and, if appropriate, other assistants and/or additives. A PU foam may be produced by mixing of more than one of the PU components and may be maintained separate during initial stages of processing. Mixing of the PU precursors may be performed in a direct soling instrument 215, immediately prior to filling a mold 240 with the CG-PU composite. In one example, the coffee grounds may be mixed with polyisocyanate components. Alternatively, coffee grounds may be mixed with other PU chemical precursors or combinations of PU chemical precursors without departing from the scope of this disclosure.

The system 200 may include an agitation system 202 and the direct soling instrument 215. In one example, the direct soling instrument 215 may be used for reaction injection molding (RIM) and may include various other components not shown in FIG. 2 for brevity. The agitation system 202 may include a cylindrical first agitation tank 204 with a mixing rod 206 attached along a central axis 203 of the first agitation tank 204. The mixing rod 206 may be coupled to a motor, for example, to drive rotation of mixing rod 206 about the central axis 203. The first agitation tank 204 may include at least two impellers to ensure mixing of contents stored in the first agitation tank 204 without separation or formation of agglomerates. For example, the contents of the first agitation tank 204 may include coffee grounds and at least a first PU precursor, which may be one or more polyisocyanate components, in one example. The contents may include additional PU precursors, where the additional PU precursors may be chemical precursors that are maintained in a mobile phase, e.g., do not react with one another to polymerize and solidify. In other words, the contents of the first agitation tank 204 may be chemically compatible so as to not undergo undesirable chemical reactions within the first agitation tank 204. A first impeller 208 and a second impeller 210 may be placed along the mixing rod 206, spaced away from one another, with the second impeller 210 closer to a base (e.g., bottom) of the first agitation tank 204 relative to the first impeller 208. In one example, the first agitation tank 204 may have a capacity of 10 liters. In other examples, the capacity of the first agitation tank 204 may be larger or smaller than 10 liters.

The first impeller 208 and the second impeller 210 may be similar in shape and size, with each impeller including at least two blades. In one example, impellers 208 and 210 may be paddle blades or turbine blades. The blades of first impeller 208 may be angled to pull an upper portion of the content of the first agitation tank 204, the upper portion of the content proximate to a top of the first agitation tank 204, down to a middle region of the first agitation tank 204. The blades of second impeller 210 may be angled to draw a lower portion of the content of the first agitation tank 204, the lower portion proximate to a bottom of the first agitation tank 204, up to the middle region of the first agitation tank 204. In one embodiment the blades of second impeller 210 may be encircled by a support ring or hoop, which may be coupled to the end of each of the second impeller blades.

In some examples, the blades of one of the impellers may be similarly configured while in other examples, the blades may have different angular orientations and sizes within the said impeller. Furthermore, the first and second impellers 208, 210 are depicted with three blades, where each blade may be angled away from an adjacent blade along a common plane by 120°. herein other examples, however, impellers with more or less blades (such less than three or more than three) may also be used within the first agitation tank 204. Upon rotation of the mixing rod 206, the impellers may be coupled to the mixing rod 206 such that both impellers rotate in the same direction. In another example, at least one of the impellers may be coupled to the mixing rod 206 (e.g., via additional mechanisms) such that the impellers may rotate in opposite directions (relative to each other) to enable more effective mixing of the PU and the coffee grounds. For example, gearing may be incorporated to allow the impellers to rotate in opposite directions. Alternatively, the first impeller 208 may be coupled to a motor at a top of the first agitation tank 204 and the second impeller 210 may be coupled to a motor at a bottom of the first agitation tank 204, thereby allowing the impellers to be independently rotated and controlled. By incorporating more than one impeller, the coffee particles may be maintained suspended in the PU matrix while formation of agglomerates is inhibited which may otherwise have adverse effects on a subsequent PU injection procedure. In yet another example, the first impeller 208 and the second impeller 210 may have opposite orientations, e.g., blade angle, such that rotation of the impellers in the same direction causes the impellers to drive movement of contents of the first agitation tank 204 in opposite directions.

The agitation system 202 may be coupled to a direct soling instrument 215 via a first feed line 218, where the direct soling instrument 215 includes a first valve 220, a second valve 222, a mixing chamber 216, and an injection nozzle 224. The mixture of coffee grounds and PU chemical precursors may be transferred from the first agitation tank 204 to the mixing chamber 216 via the first valve 220 of the direct soling instrument 215. Furthermore, the system 200 may include a second agitation tank 230 storing at least a second PU precursor, such as a polyol, for example. The second agitation tank 230 may also be configured with a mixing device, similar to the mixing rod 206 and impellers 208, 210 of the first agitation tank 204, or some other suitable mixing apparatus. In some examples, the second agitation tank 230 may demand less mixing than the first agitation tank 204 or no mixing due to storage of only liquid phase PU precursors therein.

Contents of the second agitation tank 230 may be fed to the direct soling instrument 215 by a second feed line 232 and delivered to the mixing chamber 216 via the second valve 222, concurrent with delivery of contents of the first agitation tank 204 through the first valve 220. Within the mixing chamber 216, the PU chemical precursors from both tanks, and the coffee grounds, may be mixed using a mixing mechanism, such as a rotating screw 217. The mixing chamber 216 may be coupled to a mold 240 by an injection nozzle 224 which may be used to inject mixed material from the mixing chamber 216 into a cavity 244 of the mold 240. In one example, prior to the injection of the mixed material into the mold 240, the mixed material may be heated in the mixing chamber 216 to reduce a viscosity of the material.

The first valve 220 may include an enlarged aperture relative to the second valve 222, as well as relative to conventional nozzles used for injection molding, and more specifically, for reaction injection molding, to allow passage of the coffee grounds therethrough. Details of the first valve 220 are provided below with respect to FIGS. 3A-3B, and 6. By adjusting a size of the valve aperture according to a grind of the coffee grounds, blockage at the first valve 220, which may otherwise occur due to an aperture that is too narrow for passage of the coffee grounds and a higher density of the CG-PU composite, may be circumvented.

A first component of the footwear article, such as the upper 106 of FIG. 1, may be coupled to the mold 240 onto which the midsole may be molded and cured. The mold 240 of the direct soling instrument 215 may include a seat 242 for placing the first component, e.g., the upper, of the footwear article onto which a second component, e.g., the midsole, may be injection molded. The cavity 244 may be positioned below (as shown in FIG. 2) or, in other examples, above the seat 242 for forming the first component via injection of the CG-PU composite. The cavity 244 may be shaped and sized based on the second component to be injection molded. In this example, the upper may be placed on the seat 242 and the midsole and a toe cap of the footwear article may be injection molded in the cavity 244 below the seat 242. The cavity 244 may therefore have a geometry corresponding a desired shape of the midsole and the toe cap. The midsole and toe cap may be coupled to the upper via chemical coupling (bonds) and further attachments may not be demanded. In an alternate embodiment, the direct soling instrument 215 may instead be coupled to a closed mold shaped as the midsole and the toe cap such that the midsole and toe cap are formed without a presence of the upper. The midsole and the toe cap may be coupled to the upper or at least partially coupled via other suitable attachment techniques, such as mechanical attachment using stitching, snaps, pins, etc., or indirect bonding via adhesives.

Upon cooling, the injected mixture may solidify to form the final CG-PU composite, and the upper and the midsole may be removed from the mold 240 as a single component. By using a valve aperture diameter corresponding to a grind of the coffee grounds, and injection molding the mixture of coffee grounds and PU chemical precursors directly onto the upper of the footwear, adhesion between the upper and the midsole (and toe cap) may be strengthened, relative to indirect coupling methods, thereby decreasing a likelihood of delamination. Furthermore, use of the CG-PU composite to form components of the footwear article allows substitution of PU by the coffee grounds, which may decrease an amount of PU used to form the footwear articles. Additionally, the components formed of the CG-PU composite may have a pleasing aroma, which may increase a consumer appeal of the footwear article.

An embodiment of a valve 302 of a direct soling instrument is depicted in FIG. 6, which may correspond to the first valve 220 of FIG. 2. A set of reference axes 301 are shown, indicating a longitudinal z-axis and a transverse y-axis. The valve 302 has a central axis 360 that is parallel with the z-axis. The valve 302 may have a housing 305 that extends along a portion of an overall length of the valve 302, the overall length defined along the central axis 360, which encloses various components of the valve 302. The valve 302 may include two parts: a nozzle 320 and a body 311. The body 311 may be divided into a flanged, square section (e.g., having a square profile when viewed along the central axis 360) that is proximate to the nozzle 320, and a cylindrical section that extends from the square section, opposite of the nozzle. A plunger 313 may be at least partially enclosed within the housing 305 along the body 311 of the valve 302 and may protrude from an end of the body 311 distal to the nozzle 320.

The nozzle 320 may have a narrower outer diameter than the body 311 and the outer diameter may taper to become narrower in a direction away from the body 311. The nozzle 320 may have a circular profile (e.g., when viewed along the central axis 360) and may be inserted into a receiving opening of a mixing chamber, such as the mixing chamber 216 of FIG. 2. As such, the valve 302 may be used to deliver PU chemical precursors, as well as coffee grounds mixed with the PU chemical precursors, to the mixing chamber.

Cross-sectional views of the valve 302 are depicted in FIGS. 3A-3B, representing cross-sections taken along the y-z plane.

FIG. 3A shows a first cross-sectional view 300 of the valve 302. The valve 302 is depicted in a first, open position or configuration which may fluidically couple an interior volume of the nozzle 320 to an inner volume of the mixing chamber. For example, PU chemical precursors, fed to the valve 302 via a feed line, such as the first feed line 218 of FIG. 2, may be ejected from the valve 302 and into the mixing chamber through the nozzle 320 of the valve 302. FIG. 3B shows a second schematic 350 of the valve 302, in a second, closed position or configuration. In the closed position, flow of material out of the valve 302 is blocked.

As indicated in FIG. 2, the nozzle 320 may be shaped to be inserted into the receiving opening of the mixing chamber to deliver contents of agitation tanks (e.g., the first and second agitation tanks 204, 230 of FIG. 2) via the feed lines. In one example, the nozzle 320 may be fixedly coupled to the mixing chamber. The nozzle 320 may have an inner diameter and interior volume that is small, e.g., relative to the body 311 of the valve 302 and to the inner volume of the mixing chamber, to enable controlled and rapid delivery of liquid phase material into the mixing chamber from the agitation tank. The interior volume of the nozzle 320 may be fluidically coupled to the mixing chamber when the valve 302 is in the open position of FIG. 3A.

The valve 302 may be configured to receive the liquid phase material from the agitations tank by way of ports 303 to which the feed line may be coupled. For example, the first agitation tank 204 of FIG. 2 may be coupled to at least one of the ports 303 via the first feed line 218. Contents of the agitation tank, e.g., the coffee grounds/PU precursors mixtures and other PU precursors, may be flowed to the valve 302 from the agitation tank in a controlled manner, e.g., an amount of the contents may be metered.

Adjustment of the valve 302 between the open and close positions may be enabled by shifting of the plunger 313. A plunger spring 306 may circumferentially surround the plunger 313 along a portion of a length of the plunger 313 enclosed within the housing 305, where the length is defined along the central axis 360. The plunger spring 306, when relaxed as shown in FIG. 3B, may have a length 322 that is greater than when the plunger spring 306 is compressed, as shown in FIG. 3A. In order to compress the plunger spring 306, a force may be exerted on an end of the plunger 313, e.g., an end distal to the nozzle 320, that overcomes a stiffness, e.g., a resistance to compression, of the plunger spring 306. For example, a motorized device may be coupled to an end of the plunger 313 distal to the nozzle 320 to pull the plunger 313 along the central axis 360, in a direction away from the nozzle 320. When the plunger 313 is released, allowing the plunger spring 306 to relax, the valve 302 is adjusted to the closed position, inhibiting flow of material out of the valve 302. When the plunger spring 306 is compressed, the valve 302 is in the open position, allowing the material to flow from the valve 302 to the mixing chamber.

The plunger 313 may be coupled to a needle 304 that is aligned with the plunger 313 along the central axis 360 and extends between the plunger 313 and a cap 307 of the nozzle 320. In one example, the plunger 313 and the needle 304 may be formed as a single, continuous unit. In other examples, however, the plunger 313 and the needle 304 may be separate units coupled together by fasteners, welding, a coupling connection, etc. In the open position shown in FIG. 3A, a tip 308 of the needle 304 may not be in contact with a seat 310 of the cap 307, where the cap 307 encloses the tip 308 of the needle 304. The seat 310 may be a portion of the cap 307 with a geometry that matches a shape of the tip 308 of the needle 304. In other words, when the valve 302 is in the open position, the needle 304 may be retracted such that the tip 308 is spaced away from the seat 310. When the valve 302 in the closed position, the tip 308 of the needle 304 may be seated in the seat 310 such that an aperture 312 of the nozzle 320 is sealed.

The seat 310 of the cap 307 of the valve 302 may be conical with the aperture 312 extending along the central axis 360 away from the tip 308 of the needle 304, from a center of the seat 310. The aperture 312 may directly lead to the receiving opening of the mixing chamber. The aperture 312 therefore fluidically couples an inner volume of the nozzle 320 to the inner volume of the mixing chamber. In one example, a width, e.g., a diameter, of the aperture 312 may be increased relative to that of conventional nozzles used for pristine PU injection. Enlarging the aperture 312 may facilitate smoother injection of the material, formed of a mixture of coffee grounds and PU chemical precursors, with a reduced tendency towards clogging. In some examples, the cap 307 may be removably coupled to the housing 305 of the valve 302 such that the cap 307 may be readily exchanged for another cap with an aperture of a different diameter. In other examples, the cap 307 may be configured with an adjustable width of the aperture 312.

In one example, the width of the aperture 312 may be based on the grind of the coffee grounds used in the injection molding of the mixture of coffee grounds and PU chemical precursors. In one example, the width of the aperture 312 may be in the range of 3 mm to 4 mm. In another example, the width of the aperture 312 may be at least 3 mm. In yet another example, the width of the aperture 312 may be variable and may be adjustable based on the size of the coffee grounds used in the mixture of coffee grounds and PU chemical precursors. For example, the width of the aperture 312 may be selected according to a largest (e.g., maximum) grind of the coffee grounds used. By increasing the width of the aperture 312 based on the size of the coffee grounds, pressure in the aperture 312 may be reduced and mechanical wear on the valve 302 during injection of a dense composite material may be decreased, thereby improving a performance of the nozzle.

When the valve 302 is open, the aperture 312 may not be blocked by the tip 308 of the needle 304 and the mixture of coffee grounds and PU chemical precursors may flow out of the aperture 312. In the closed configuration of the valve 302 (as seen in FIG. 3B), the tip 308 of the needle 304 may be in face-sharing contact with the seat 310 of the needle. When the tip 308 is contacting the seat 310, the aperture 312 may be blocked off and the mixture may not flow out of the valve 302 via the aperture 312.

A volume of the contents delivered to the mixing chamber from the agitation tank by the valve 302 may therefore be metered to mix a suitable amount of the contents, e.g., the coffee grounds, polyisocyanate components, and other compatible precursors, with a metered amount of contents of another agitation tank (e.g., the second agitation tank 230 of FIG. 2). The other agitation tank may include remaining PU chemical precursors (e.g., polyols and catalysts) that are similarly delivered to the mixing chamber via a valve, such as the second valve 222 of FIG. 2. A volume of a resulting metered mixture that is combined in the mixing chamber may correspond to a volume of a cavity of a mold, such as the mold 240 of FIG. 2, coupled to the mixing chamber. For example, an amount that entirely fills the cavity without causing excess foamed material to ooze out of the mold and/or cause backpressure in the direct soling instrument may be predetermined and used to determine how much of the contents of the agitation tanks is delivered to the mixing chamber. As described above, backpressure in the valve 302 may be at least partially mitigated by sizing the aperture 312 of the nozzle 320 according to the grind(s) of the coffee grounds.

FIG. 4 shows an example method 400 for processing a mixture of coffee grounds and PU chemical precursors to form a component of a footwear article. The footwear component may be composed of a CG-PU composite produced by processing of the mixture using a direct soling instrument, such as the direct soling instrument 215 of FIG. 2. The coffee grounds may be leftover (waste) product from brewing of coffee beverages using ground coffee beans. The coffee grounds may be porous, resulting in a high water content of the grounds. Furthermore, the coffee grounds may vary in grind and may encompass a range of particle diameters.

At 402, the coffee grounds may be dried to remove the water content. In one example, the drying of the coffee grounds may be conducted by exposing the coffee grounds to direct sunlight. In another example, other drying methods such as use of heat lamps and desiccating materials may be applied to the coffee grounds. By drying out the coffee grounds, a mechanical strength of the resulting CG-PU composite may be improved, e.g., dilution of mechanical properties of a PU matrix of the CG-PU composite is circumvented. Moisture of the coffee grounds may be estimated via, for example, a moisture meter that operates by comparing differences in electric conductivity of between moist and dry organic materials (such as grains and seeds).

Upon drying the coffee grounds, at 404, the coffee grounds may be separated into different size groups based on grind. In one example, the coffee grounds may be divided into large, medium, and small grounds. The separation may be carried out using a sieving method comprising passing the grinds through sieves of different sizes. As an example, sieves with opening of 2 sq. mm (e.g., 10 mesh), 1 sq. mm (e.g., 18 mesh), and 0.5 sq. mm (e.g., 35 mesh) may be used sequentially, resulting in three different size groups (e.g., large, medium and small). The size of the large grounds may be in a range of less than 2 sq. mm and greater than or equal to 1 sq. mm, the size of the medium grounds may be in a range less 1 sq. mm and greater than or equal to 0.5 sq. mm, and the size of the small grounds may be less than 0.5 sq. mm.

In one example, if the coffee grounds are larger than the desired size range (such as larger than 2 sq. mm size) or if a large portion, such as greater than 50%, of the coffee grounds are larger than 2 sq. mm, the coffee grounds may be further ground to reduce their grinds and then sorted into the aforementioned size groups.

At 406, at least one size group of the coffee grounds may be selected to be mixed with a batch of PU chemical precursors. As an example, separate batches of PU chemical precursors may each be premixed with one or more of the size groups of the coffee grounds, including small grounds, medium grounds, and large grounds. By separating out the size of the grounds mixed into a PU matrix of the resulting CG-PU composite, a uniformity, e.g., uniformity of mechanical properties and of distribution of the coffee grounds across the PU matrix, of the composite may be maintained. Uniformity of the composite may enhance its desirable mechanical properties and as well as its visual appeal (once molded into the footwear component). An amount of coffee grounds mixed in each batch may be consistent. In one example, the amount of coffee mixed in each batch may be in the range of 2% to 15% by weight of the PU. In another example, the amount of coffee mixed may be 3% to 5% by weight in PU.

In another example, based on a design of the footwear article, coffee grounds of different grinds, e.g., belonging to different size groups, may be mixed to form a single batch of the CG-PU composite which may then be used to form one or more components of the footwear. A first amount of coffee grounds of a first size group may be mixed with a second amount of coffee grounds of a second size group and the mixed grounds may be used to form a mixture of coffee grounds and PU chemical precursors.

The coffee grounds may be pre-mixed with chemical precursors for forming a first mixture in a container using an electric powered mechanical mixer. For example, the mechanical mixer may be the mechanical mixer 500 of FIGS. 5A-5B. The chemical precursors for forming the first mixture may include polyisocyanate components, polyol, polypropylene oxide, chain extender, polyetherpolyols, polymer polyetherpolyols, chain extender, catalysts, blowing agent(s), and, if appropriate, other assistants and/or additives. In one example, the first mixture may include at least one polyisocyanate component. The mechanical mixer may include a stirrer with a helical end or rotating helix, for example, which may rotate about a central axis of the mechanical mixer, thereby mixing the coffee grounds in the PU chemical precursors. Since the chemical precursors are in liquid form, mixing with the mechanical mixer may pre-disperse the coffee grounds within the PU chemical precursors, allowing the mixture to have a uniform consistency prior to further mixing in an agitation tank.

In order to further increase a homogeneity of the mixture, the mixture of coffee grounds and the PU chemical precursors may then be transferred to a first agitation tank (such as the first agitation tank 204 of FIG. 2) at 408. The first agitation tank may include at least two impellers attached to a central shaft. The impellers may be mechanically rotated to further mix the coffee grounds and PU chemical precursors mixture. As an example, an upper impeller may push down the coffee grounds and PU chemical precursors mixture towards the bottom of the tank while a lower impeller may push the coffee grounds and PU chemical precursors mixture upwards while constantly agitating the mixture, ensuring that the coffee grounds stay suspended in the PU chemical precursors and do not settle at the bottom of the tank.

Additional PU chemical precursors of a second mixture may be stored in a second agitation tank, such as the second agitation tank 230 of FIG. 2. The second agitation tank may be configured with impellers similar to the impellers of the first agitation tank or may include other mixing mechanisms. In one example, less rigorous mixing of the second agitation tank may be demanded and a simple mixing device or mechanism may be used. For example, the second mixture may include at least one polyol while the first mixture may include the coffee grounds and at least one polyisocyanate component, as described above. One or more of the first and second agitation tanks may include other PU precursors.

While the first mixture and the second mixture are mixed in the first agitation tank and the second agitation tank, respectively, at 410, valves may be attached to a mixing chamber of the direct soling instrument. For example, a first valve of the valves may be the valve 302 of FIGS. 3A-3B and 6, having a nozzle aperture that is selected based on a maximum grind of the coffee grounds mixed with the PU precursor in the first agitation tank. In one example, the nozzle of the first valve may have a fixed aperture of at least 3 mm to allow smoother flow of the mixture of coffee grounds and PU chemical precursors without generating backpressure on a feed line, e.g., the first feed line 218 of FIG. 2, and associated components that fluidically couple the first valve to the first agitation tank.

In another example, the nozzle may be of variable aperture diameter and the aperture diameter may be adjusted/selected based on the coffee grounds grind(s) being used for the mixture. As an example, the size (e.g., diameter) of the aperture may be increased with an increase in the grind of the coffee grounds. In this way, by using an aperture diameter corresponding to the grind of the coffee grounds, a flow of the coffee grounds and PU chemical precursors mixture through the first valve and a pressure within the first valve may be maintained consistent. agitation tank.

A second valve of the valves, e.g., the second valve 222 of FIG. 2, may also be coupled to the mixing chamber and may feed the second mixture to the mixing chamber from the second agitation tank. The second valve may have a smaller nozzle aperture than the first valve, in one example, and may be configured to flow only liquid phase materials therethrough. It will be appreciated that a timing of when the valve is attached to the direct soling instrument is exemplary and may, in other examples, occur at any point prior to 412 of the method 400, but not after. For example, the valve may be attached at the start of the method 400, or during premixing of the coffee grinds with the PU chemical precursors, etc.

At 412, a component of the footwear article (such as an upper), onto which the CG-PU composite is to be injection molded, may be positioned in a seat of a mold, such as the mold 240 of FIG. 2. It will be appreciated that the footwear component may be positioned in the seat of the mold at any point before 414 of the method 400, but not after. For example, the footwear component may already be situated in the seat of the mold at the start of the method 400. A cavity of the mold may be positioned directly below or above the footwear component and the cavity may be shaped with a geometry corresponding to a target component(s) to be molded (such as a midsole and toe cap of the footwear article). Furthermore, the mixing chamber may be coupled to the mold by, for example, an injection nozzle, such as the injection nozzle 224 of FIG. 2. Coupling of the mixing chamber to the mold may also occur at any point before 414. For example, the method 400 may be initiated with the mixing chamber already coupled to the mold.

At 414, the first and second mixtures may be transferred from the respective agitation tanks to the mixing chamber. In one example, the mixtures may be in predominantly in liquid phases and may be delivered to the mixing chamber via feed lines. A volume of each the of the first and second mixtures may be metered to deliver a target, predetermined amount of each mixture and delivered to the mixing chamber by adjusting the first and second valves to open positions. As described previously, the mixing chamber may be heated, in some examples, to promote mixing and formation of a PU foam. As the first and second mixture mix in the mixing chamber, chemical reactions between the PU chemical precursors are initiated, causing the mixed liquid phases to polymerize and foam.

At 416, the PU foam, with the coffee grounds dispersed into the PU foam, is injected into the mold by the injection nozzle. The PU foam may entirely fill the cavity of the PU foam and, upon leaving the mixing chamber, begin to cool and solidify. Within the cavity of the mold, the CG-PU composite may be shaped as the target component of the footwear article (e.g., the midsole and the toe cap). The midsole and toe cap may bond irreversibly with the upper and may together be removed from the mold as a single component. In this way, by directly molding the integrated midsole and toe cap, formed of the CG-PU composite, onto the upper, a robust footwear may be manufactured with a reduced likelihood of delamination. Particles of the coffee grounds may be visible and evenly dispersed in the midsole and the toe cap and the sole may have an aroma of coffee. In other examples, other components of a footwear article such as an outsole, an insole, an upper, etc., may be alternatively or additionally formed with the CG-PU composite using the steps described above of the method 400.

Upon formation of the midsole (and toe cap) with concurrent bonding of the midsole to the upper and cooling of the CG-PU composite, the footwear article may be completed at 418 by attaching other components such as the outsole, insole, eyelets such as by mechanical attachment using stitching, snaps, pins, etc.

In this way, an amount of PU used to form at least one component of a footwear article may be reduced by substituting a portion of the PU with coffee grounds. The coffee grounds may be dried and sorted into size groups according to grind. The dried coffee grounds of one or more size groups may be pre-mixed with PU chemical precursors using a mechanical mixer and transferred to an agitation tank for further mixing, the agitation tank including at least two impellers. The agitation tank may be fluidically coupled to a valve of a direct soling instrument configured with nozzle for injecting a mixture formed of the coffee grounds and the PU chemical precursors into a mixing chamber of the direct soling instrument. The nozzle may have an aperture sized according to the grinds of the coffee grounds, thereby reducing a likelihood of clogging and blockage at the aperture. The footwear component may be formed via injection molding with a CG-PU composite, thus providing a robust footwear article with a pleasing appearance and fragrance while retaining desirable mechanical properties of PU.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, acts, and/or properties disclosed herein, as well as any and all equivalents thereof.

FIGS. 1, 3A-3B, 5 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Elements offset from one another may be referred to as such, in some examples. Further, FIGS. 1, 3A, 3B, 5, and 6 are drawn approximately to scale although other relative dimensions may be used.

The disclosure also provides support for a method for forming an article of footwear, comprising: fabricating a mixture of polyurethane (PU) and coffee grounds of a selected grind group using a two-step mixing, and injection molding one or more components of the article of footwear onto another component of the footwear using the mixture, the one or more components of the article of footwear formed of a coffee grounds-PU composite material. In a first example of the method, using the two-step mixing includes a first step of combining chemical precursors of PU with dried coffee grounds of the selected grind group in a container and mixing the chemical precursors of PU with the coffee grounds using a mechanical mixer including a mixing head. In a second example of the method, optionally including the first example, the mixing head is a rotating helix and rotation of the mixing head is driven by a motor. In a third example of the method, optionally including one or both of the first and second examples, using the two-step mixing includes a second step of further mixing chemical precursors of PU with the coffee grounds in an agitation tank fitted with at least two impellers. In a fourth example of the method, optionally including one or more or each of the first through third examples, mixing the chemical precursors of PU with the coffee grounds in the agitation tank includes pushing the mixture upwards within the agitation tank via rotation of one of the at least two impellers and pushing the mixture downwards within the agitation tank via rotation of the other of the at least two impellers. In a fifth example of the method, optionally including one or more or each of the first through fourth examples, the method further comprises: transferring the mixture from the agitation tank to a direct soling instrument and mixing the mixture with other PU chemical precursors to form a foam in a mixing chamber of the direct soling instrument. In a sixth example of the method, optionally including one or more or each of the first through fifth examples, injection molding includes transferring the mixture to the mixing chamber via a valve, the valve having a nozzle with an aperture of at least 3 mm. In a seventh example of the method, optionally including one or more or each of the first through sixth examples, injection molding includes placing the another component of the article of footwear above or below a cavity of a mold and injecting the mixture from the mixing chamber into the mold to form the one or more components of the article of footwear directly above or below the another component of the article of footwear. In a eighth example of the method, optionally including one or more or each of the first through seventh examples, injection molding the one or more components of the article of footwear onto the another component of the article of footwear includes injection molding a midsole and a toe cap onto an upper of the article of footwear. In a ninth example of the method, optionally including one or more or each of the first through eighth examples, the method further comprises: drying the coffee grounds under sunlight and/or a source of heat prior to fabricating the mixture of the PU and the coffee grounds. In a tenth example of the method, optionally including one or more or each of the first through ninth examples, the method further comprises: sorting the dried coffee grounds into at least three distinct grind groups and then fabricating separate batches of coffee grounds-PU composites with one distinct size of the coffee grounds.

The disclosure also provides support for a method for forming a midsole of a footwear, comprising: drying coffee grounds, sorting the dried coffee grounds into size groups according to grind, mixing an amount of the dried coffee grounds of at least one of the size groups with chemical precursors of polyurethane (PU) using each of a mechanical mixer and an agitation tank, the agitation tank including at least two impellers, and injection molding the midsole of the footwear with a coffee grounds-PU composite formed from the dried coffee grounds and the chemical precursors of the PU via a direct soling instrument fitted with a valve having an aperture corresponding to a maximum size of the dried coffee grounds. In a first example of the method, injecting molding the midsole includes maintaining a consistent flow of the coffee grounds-PU composite by selecting a diameter of the aperture based on a largest size group of the dried coffee grounds used for mixing, and wherein the valve has one or fixed or adjustable aperture. In a second example of the method, optionally including the first example, sorting the dried coffee grounds into the size groups includes sorting the dried coffee grounds according a first size group of less than 2 sq. mm and greater than or equal to 1 sq. mm, a second size group of less than 1 sq. mm and greater than or equal to 0.5 sq. mm, and a third size group of less than 0.5 sq. mm. In a third example of the method, optionally including one or both of the first and second examples, mixing the amount of the dried coffee grounds with the chemical precursors of the PU includes mixing 3% to 5% by weight of the dried coffee grounds in the coffee grounds-PU composite. In a fourth example of the method, optionally including one or more or each of the first through third examples, mixing using the agitation tank includes agitating the dried coffee grounds and the chemical precursors of the PU in the agitation tank with one of the at least two impellers positioned proximate to a top of the agitation tank and another of the at least two impellers positioned proximate to a bottom of the agitation tank.

The disclosure also provides support for an article of footwear, comprising: a midsole and a toe cap formed from a composite of polyurethane and coffee grounds, the composite including 3%-10% by weight of dried coffee grounds of a single size. In a first example of the system, the coffee grounds are visibly dispersed through the midsole and toe cap. In a second example of the system, optionally including the first example, the midsole and the toe cap have an aroma of coffee. In a third example of the system, optionally including one or both of the first and second examples, the composite has similar mechanical properties to pristine polyurethane.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any articles, devices, or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for forming an article of footwear, comprising:
    fabricating a mixture of polyurethane (PU) precursors and coffee grounds of a selected grind group using a two-step mixing, wherein using the two-step mixing includes a second step, executed after a first step, of further mixing the PU precursors with the coffee grounds in an agitation tank fitted with at least two impellers;
    transferring the mixture from the agitation tank to a direct soling instrument and mixing the mixture with other PU precursors to form a foam in a mixing chamber of the direct soling instrument; and
    injection molding one or more components of the article of footwear onto another component of the article of footwear using the mixture, the one or more components of the article of footwear formed of a coffee grounds-PU composite material.

2. The method of claim 1, wherein using the two-step mixing includes a first step of combining the PU precursors with dried coffee grounds of the selected grind group in a container and mixing the PU precursors with the coffee grounds using a mechanical mixer including a mixing head.

3. The method of claim 2, wherein the mixing head is a rotating helix and rotation of the mixing head is driven by a motor.

4. The method of claim 1, wherein mixing the PU precursors with the coffee grounds in the agitation tank includes pushing the mixture upwards within the agitation tank via rotation of one of the at least two impellers and pushing the mixture downwards within the agitation tank via rotation of the other of the at least two impellers.

5. The method of claim 1, wherein injection molding includes transferring the mixture to the mixing chamber via a valve, the valve having a nozzle with an aperture of at least 3 mm.

6. The method of claim 5, wherein injection molding includes placing the another component of the article of footwear above or below a cavity of a mold and injecting the mixture from the mixing chamber into the mold to form the one or more components of the article of footwear directly above or below the another component of the article of footwear.

7. The method of claim 1, wherein injection molding the one or more components of the article of footwear onto the another component of the article of footwear includes injection molding a midsole and a toe cap onto an upper part of the article of footwear.

8. The method of claim 1, further comprising drying the coffee grounds via sunlight and/or a source of heat prior to fabricating the mixture of the PU precursors and the coffee grounds.

9. The method of claim 8, further comprising sorting the dried coffee grounds into at least three distinct grind groups and then fabricating separate batches of coffee grounds-PU composites with one distinct size of the coffee grounds.

10. A method for forming a midsole of a footwear, comprising:
    drying coffee grounds;
    sorting the dried coffee grounds into size groups according to grind;
    mixing an amount of the dried coffee grounds of at least one of the size groups with chemical precursors of polyurethane (PU) using each of a mechanical mixer and an agitation tank, the agitation tank including at least two impellers; and
    injection molding the midsole of the footwear with a coffee grounds-PU composite formed from the dried coffee grounds and the chemical precursors of the PU via a direct soling instrument fitted with a valve having an aperture corresponding to a maximum size of the dried coffee grounds.

11. The method of claim 10, wherein injecting molding the midsole includes maintaining a consistent flow of the coffee grounds-PU composite by selecting a diameter of the aperture based on a largest size group of the dried coffee grounds used for mixing, and wherein the valve has one or fixed or adjustable aperture.

12. The method of claim 10, wherein sorting the dried coffee grounds into the size groups includes sorting the dried coffee grounds according to a first size group of less than 2 sq. mm and greater than or equal to 1 sq. mm, a second size group of less than 1 sq. mm and greater than or equal to 0.5 sq. mm, and a third size group of less than 0.5 sq. mm.

13. The method of claim 10, wherein mixing the amount of the dried coffee grounds with the chemical precursors of the PU includes mixing 3% to 5% by weight of the dried coffee grounds in the coffee grounds-PU composite.

14. The method of claim 10, wherein mixing using the agitation tank includes agitating the dried coffee grounds and the chemical precursors of the PU in the agitation tank with one of the at least two impellers positioned proximate to a top of the agitation tank and another of the at least two impellers positioned proximate to a bottom of the agitation tank.

15. A method for forming an article of footwear, comprising:
    fabricating a mixture of polyurethane (PU) precursors and coffee grounds of a selected grind group using a two-step mixing; and
    injection molding one or more components of the article of footwear onto another component of the article of footwear using the mixture, the one or more components of the article of footwear formed of a coffee grounds-PU composite material, and wherein injection molding the one or more components of the article of footwear onto the another component of the article of footwear includes injection molding a midsole and a toe cap onto an upper part of the article of footwear.

* * * * *